(No Model.)
C. F. WALDRON.
SEPARATOR FOR THE PLATES OF SECONDARY BATTERIES.
No. 463,879. Patented Nov. 24, 1891.
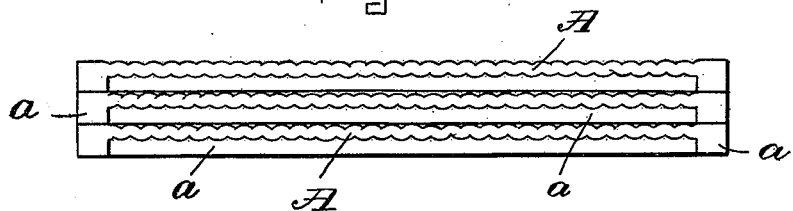
Fig. 1.
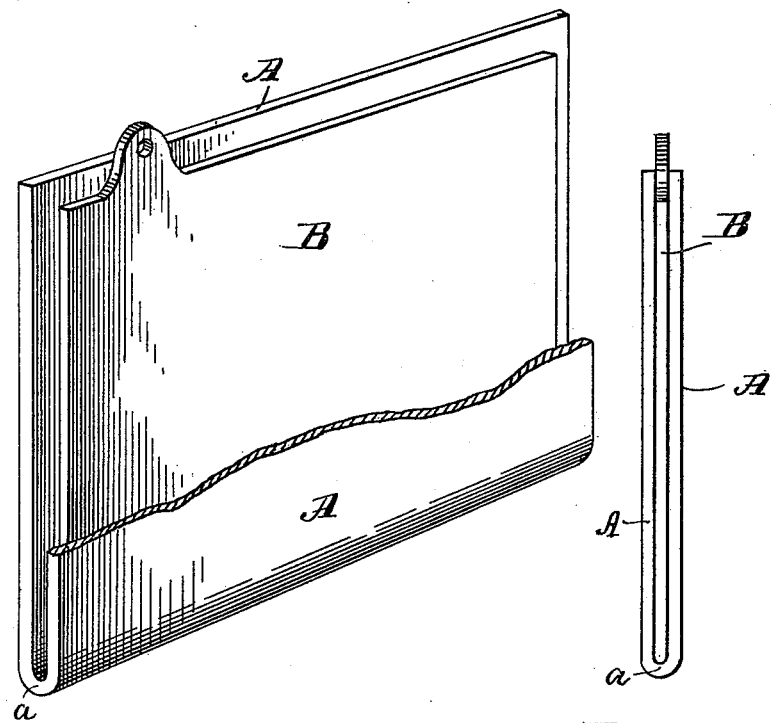
Fig. 3.
Fig. 2.
WITNESSES.
Henry Marsh.
William P. Forden.
INVENTOR.
Charles F. Waldron
by A. W. Kenees,
Attorney

UNITED STATES PATENT OFFICE.

CHARLES F. WALDRON, OF BOSTON, MASSACHUSETTS, ASSIGNOR OF ONE-HALF TO CHARLES J. PILLSBURY AND WALTER J. LITCHFIELD, OF SAME PLACE.

SEPARATOR FOR THE PLATES OF SECONDARY BATTERIES.

SPECIFICATION forming part of Letters Patent No. 463,879, dated November 24, 1891.

Application filed January 12, 1891. Serial No. 377,405. (No model.)

*To all whom it may concern:*

Be it known that I, CHARLES F. WALDRON, of Boston, in the county of Suffolk and State of Massachusetts, have invented certain new and useful Improvements in Separators for the Plates of Secondary Batteries, of which the following, taken in connection with the accompanying drawings, is a specification.

The object of this invention is to provide improved separators for the adjacent plates of secondary electric batteries for the purpose of keeping such plates at the proper distance from each other, supporting them properly while being handled or transported, and preventing their contact with each other, either directly or by reason of the crumbling of the active material on their surfaces forming a connection at the bottom of the cells, such material being by my improvement kept from crumbling or from contact with the opposite plate.

My separators are in the form of wooden pockets or folds, each one of which incloses one of the plates of each pair, so as to keep it from contact with the opposite plate and to support the active material thereon. I prefer to use yellow pine for these pockets or folds, since the battery-liquids have no appreciably injurious effect upon them, and I roughen the surfaces or perforate the wood sufficiently to admit the liquids between or through them and give vent to the gases.

These separators are adapted for use with plates of any ordinary construction, and when properly combined with such plates and immersed in the usual liquid constitute a desirable form of battery, the plates being partitioned off, as in separate pockets.

In the drawings, Figure 1 is a top view of a series of recessed pockets having thickened edges or flanges. Fig. 2 is an edge view of one of the folds or open-end pockets, with a battery-plate in position between its front and rear portions. Fig. 3 is a perspective view of such fold and plate, the wood being broken away in front to show the plate more fully.

A represents the separator in either of the forms shown, and B the battery-plate received in the pocket or fold thereof.

In Fig. 1 the face of the separator is cut away or recessed, leaving at its sides and bottom a thickened flange $a$, against which the back of the next separator rests, so that the plate is in a deep narrow pocket and is surrounded front and back and on three sides by the wood. The flanges $a$ may be strips attached along the edges and of about the same thickness as the inclosed plates.

In Figs. 2 and 3 the recess to receive the plate B is in the form of a deep slot between the front and rear walls of the separator, which are connected at the bottom only, leaving the ends open beyond the edges of the plate for the free entrance of the liquid. In this form the space-giving flanges $a$ are omitted at each side of the plate, and the front and rear walls and their bottom connection may be integral. It is clear that by means of these pockets in either form closed at bottom and extending up in front and rear of the plate there can be no contact with the opposite plates either direct and laterally or by reason of crumbling of the active material forming a connection and causing short-circuiting.

I claim as my invention—

1. The battery-plate separator described, consisting of the wooden pockets A $a$, recessed to receive the plate B, and closed at bottom to prevent short-circuiting, substantially as set forth.

2. The combination, with the battery-plates, of the deep narrow wooden pockets A $a$, open at top, closed at bottom, and extending beyond the battery-plates at each end thereof, substantially as set forth.

In testimony whereof I have signed my name to this specification, in the presence of two subscribing witnesses, on this 22d day of December, A. D. 1890.

CHARLES F. WALDRON.

Witnesses:
A. H. SPENCER,
JAS. P. PRINCE.